(12) United States Patent
Sridharan et al.

(10) Patent No.: US 11,003,684 B1
(45) Date of Patent: May 11, 2021

(54) COOPERATIVE LOG APPLICATION

(71) Applicant: Amazon Technologies, Inc., Seattle, WA (US)

(72) Inventors: Shriram Sridharan, Sunnyvale, CA (US); Kamal Kant Gupta, Snoqualmie, WA (US); Alexandre Olegovich Verbitski, Woodinville, WA (US); Stefano Stefani, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 919 days.

(21) Appl. No.: 15/199,697

(22) Filed: Jun. 30, 2016

(51) Int. Cl.
*G06F 16/27* (2019.01)
*G06F 16/23* (2019.01)

(52) U.S. Cl.
CPC .......... *G06F 16/27* (2019.01); *G06F 16/2358* (2019.01)

(58) Field of Classification Search
CPC .............................. G06F 16/27; G06F 16/2358
See application file for complete search history.

(56) References Cited

U.S. PATENT DOCUMENTS

| | | | | |
|---|---|---|---|---|
| 9,507,843 B1* | 11/2016 | Madhavarapu | ... | G06F 17/30575 |
| 9,785,510 B1* | 10/2017 | Madhavarapu | ..... | G06F 11/1451 |
| 9,842,031 B1* | 12/2017 | Kharatishvili | .... | G06F 17/30575 |
| 2003/0217081 A1* | 11/2003 | White | ................. | G06F 12/0813 |
| 2014/0324785 A1* | 10/2014 | Gupta | ............... | G06F 17/30368 707/689 |
| 2015/0277969 A1* | 10/2015 | Strauss | ................... | G06F 9/466 707/703 |
| 2016/0004718 A1* | 1/2016 | Lin | .................... | G06F 17/30171 707/690 |
| 2016/0070774 A1* | 3/2016 | Barabas | ............ | G06F 17/30348 707/634 |
| 2016/0314162 A1* | 10/2016 | Tarta | ................. | G06F 17/30359 |
| 2017/0300412 A1* | 10/2017 | Johnson | .............. | G06F 12/0804 |

\* cited by examiner

*Primary Examiner* — James Trujillo
*Assistant Examiner* — Kurt A Mueller
(74) *Attorney, Agent, or Firm* — Davis Wright Tremaine LLP

(57) ABSTRACT

A replica database may receive a replication instruction from a master. The replica may maintain a version of a collection of data in database pages stored on a storage device. A replication thread may process the instruction. The replication thread may determine that an item affected by the instruction is located in a page that is both loaded into a memory buffer and subject to contention. The page may be modified with information indicating that the instruction has not been processed. A subsequent reader thread may, while processing a request to access the page, apply the instruction and complete processing of the request.

20 Claims, 8 Drawing Sheets

US 11,003,684 B1

COOPERATIVE LOG APPLICATION

BACKGROUND

In a distributed database system, a process commonly known as database replication may be employed to copy data between database nodes. In a replicated system, a master database may maintain a collection of data and process various requests to change the state of the collection. A second database, sometimes referred to as a replica, may receive transaction log records from the master database, where the log records describe the changes made to the master database. By applying the same or changes to the replica, the second database may effectively serve as a copy of the master.

Replicas may be used for a variety of purposes. One such purpose involves the distribution of read-related workload across the nodes of a distributed database system. As noted, the master database may be tasked with processing requests to update the collection of data maintained by the system. Meanwhile, one or more replica databases may process requests to read the data, while also keeping their copies of the collection up-to-date with respect to the master database through replication. A drawback to this approach is that the replication process may sometimes interfere with the handling of requests to read the data, and vice versa.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
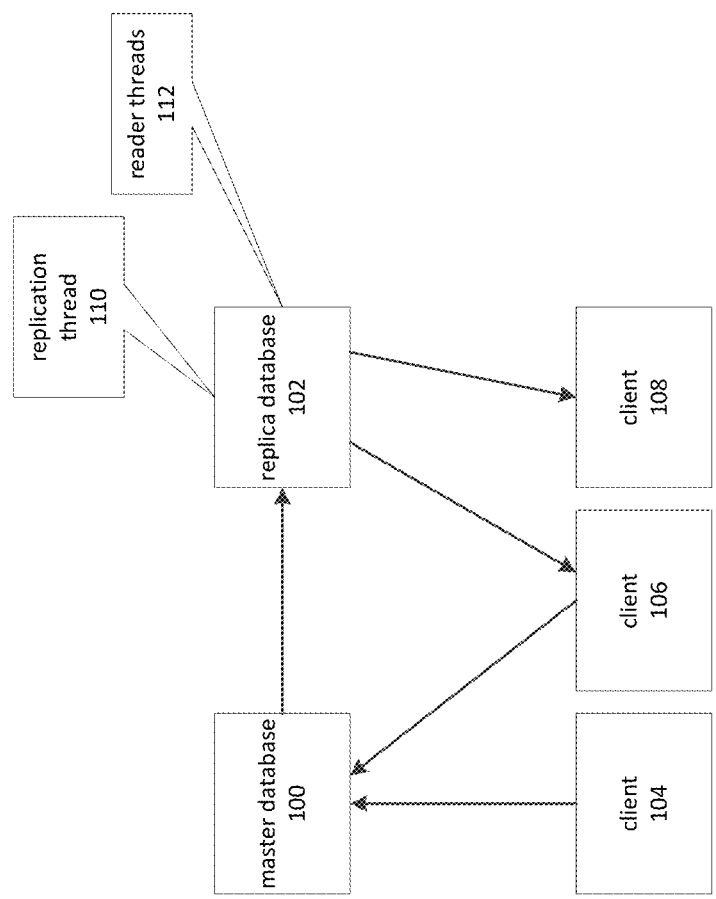
FIG. 1 is a block diagram depicting an example of a database system.

Disclosed herein are systems, methods, and computer program products related to database replication. A database system may comprise a master database whose contents are mirrored on a second database sometimes referred to as a replica. As data changes on the master database, descriptions of the changes may be sent to the replica and applied to the mirrored collection of data. In some instances, the replica is used to distribute read-related workload. In such instances, changes to the data may be made initially to the master database and replicated, while read workload is distributed across some number of replicas.

In some cases, the replication process may be inefficient because of conflicts between the replication process and the read workload. In particular, lock contention may occur between threads of the second database that apply replicated changes and the threads that process requests to access the data. To reduce lock contention, embodiments may detect contention between the replication and read threads and, in response, mark a contended database page with information that indicates that a replication instruction applicable to the page has yet to be processed. The approach may, in effect, transfer responsibility for applying the replication instruction from the replication thread to a thread that processes requests to access the page.

In an example, a master database may maintain a collection of data and a second database may maintain a replica of that collection. When the state of the collection changes, the master database may send the second database information that is indicative of a change to an item in the collection of data. This information may be referred to herein as a replication instruction. The second database may maintain its replica of the collection as a plurality of pages, sometimes referred to as blocks or storage units, which are kept on a storage device. The pages may be organized into a tree structure that facilitates locating items within the collection.

To apply the replication instruction, a replication thread of the second database may determine that an item affected by the replication instruction is located in a first page. The second database may also determine that a copy of the page has been loaded into a memory buffer, and that access to the copy of the page is subject to lock contention. Rather than waiting to acquire a lock to the page, or further contributing to the contention, the replication thread may mark the page with a "hint" record that indicates that a replication instruction that is applicable to the page has yet to be processed. Subsequently, a reader thread may begin to process a request to access data that is located on the page. The reader thread may then determine that the "hint" has been set on the page, and proceed to modify the page based on the replication instruction.

Locks generally refer to a mechanism for synchronizing access to a computing resource. Generally speaking, locks may be categorized as exclusive and non-exclusive. Generally speaking, exclusive locks may be used for operations that modify data, while non-exclusive locks may be used for operations that involve only reading data. Note that the presence of a non-exclusive lock will prevent an exclusive lock from being acquired, as long as the non-exclusive lock is held.

FIG. 1 is a block diagram depicting an example of a database system 120. A database system 120 may comprise a master database 100 and a replica database 102. The master database 100 may maintain a collection of data, such as relational database tables, collections of name-value pairs, and so forth. The replica database 102 may maintain a version of the collection of data. The version of the collection maintained by the replica database 102 may sometimes be referred to as a replica or copy of the collection of data maintained by the master database 100. Typically, although sometimes referred to as a copy or replica, the version of the collection maintained by the replica database 102 is a subset of the collection of data maintained by the master database 100. This may be the case for at least two reasons. First, the replica maintained by the replica database 102 may be intended to correspond to only a subset of the primary collection of data maintained by the master database. For example, the replica database 102 might only maintain a replica of a subset of the tables maintained by the master database 100. Second, the replica maintained by the replica database may be out-of-date with respect to changes made to the master database 100.

The master database 100 may process requests to change the state of the primary collection of data. The requests may, for example, be sent from clients 104, 106 to the master database 100. The requests may, for example, comprise insert, update, or delete statements defined via a database query language. In some instances, the volume requests of this sort may be high and, consequently, the master database 100 may issue a correspondingly high volume of replication instructions to the replica database 102.

The master database may transmit data indicative of the statements to replica database 102. The data may comprise instructions to apply corresponding changes to the version of the collection of data maintained by the replica database 102, i.e. to the replica. This may involve a technique sometimes referred to as log shipping, in which a database's transaction log file, or parts thereof, are send from a master database 100 to a replica database 102. More generally, the process of maintaining the replica is sometimes referred to as replication.

Within the replica database 102, the process of replication may involve a replication thread 110 which processes the data received from the master database 100. The replica database 102 may receive data describing a change to the state of the primary collection of data. The replication thread 110 may process the data by identifying an item in the collection of data that is affected by the state change, and applying the change in accordance with the data.

Typically, the replication thread 110 obtains exclusive rights to access the data in order to apply the change. There may be various reader threads 112 executing within the replica database 102. These reader threads 112 may, for example, be processing requests to access data in the replica. The requests might, for example, be issued by various clients 106, 108. The replication thread 110 may obtain exclusive rights to a data item, temporarily precluding the reader threads 112 from accessing the same data. Consequently, if the demand for read access to the data is high, the replication thread 110 may begin to fall behind, particularly if the volume of data coming from the master database 100 is also high. Similarly, the reader threads 112 may also begin to slow down if the replication thread 110 frequently obtains exclusive locks on the data. This type of conflict, involving threads competing for access to a resource, is sometimes referred to as contention. An item of data in a collection of data is subject to contention if competition for access to the item such that the competition adversely affects performance of the system. Contention may be defined in relation to various metrics, such as the amount of time a replication thread 110 or reader thread 112 typically waits to obtain access to an item of data.

Figure 2:
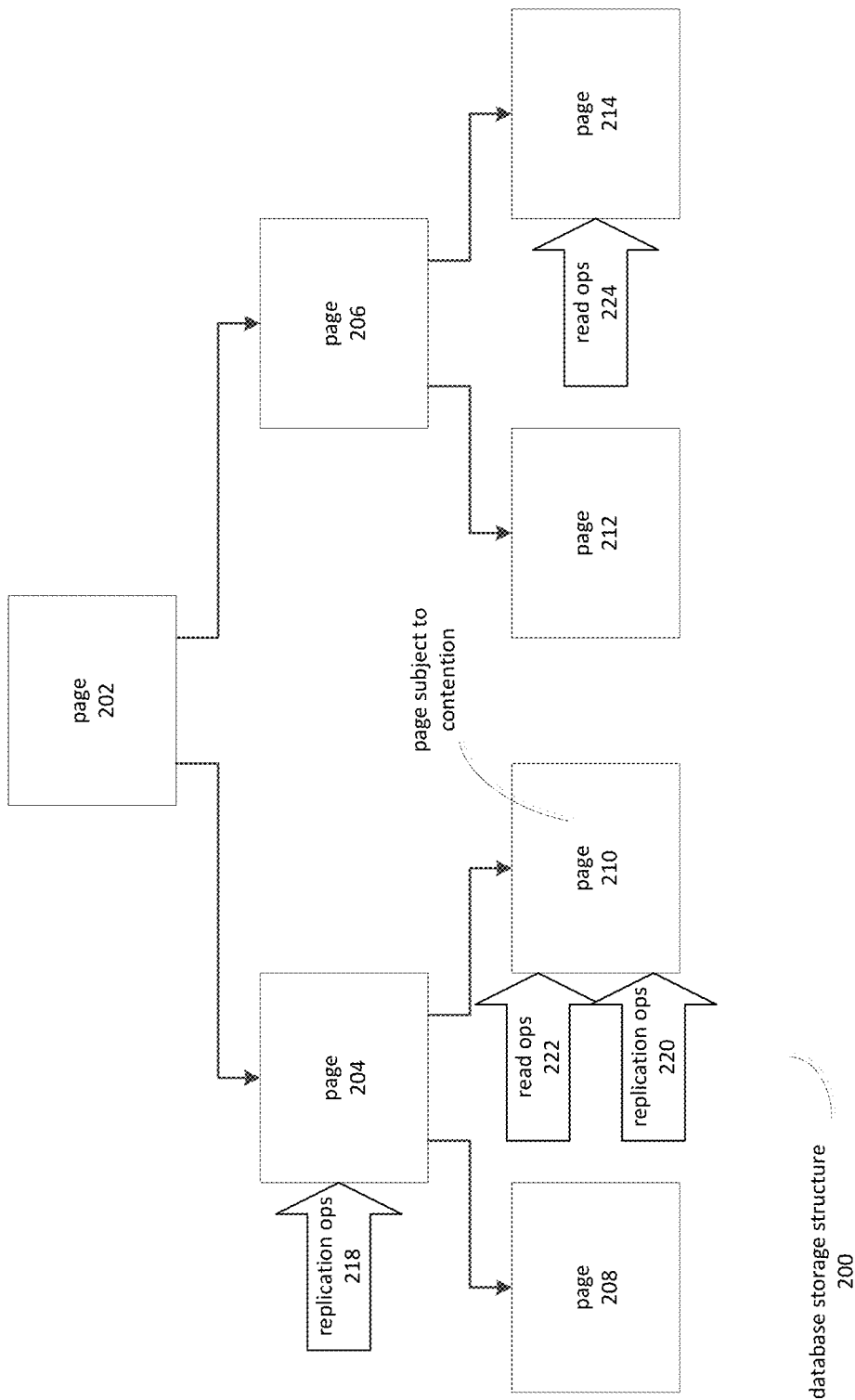
FIG. 2 is a block diagram depicting a database storage structure.

FIG. 2 is a block diagram depicting a database storage structure 200. A database, such as the replica database 102 depicted in FIG. 1, may maintain a collection of data on a storage device using a structure similar to the database storage structure 200 depicted by FIG. 2. For example, a database may store data in a structure such as a B– Tree, B+ Tree, indexed sequential access method ("ISAM") files, and so on. The structure depicted by FIG. 2 is intended to be illustrative of one of many example storage systems, and should not be viewed as limiting the scope of the present disclosure to databases that employ the depicted storage structure.

In the example of FIG. 2, a tree-based structure may be comprised of various page records 202-214. Each of the pages 202-214 may comprise data for the items that make up the collection. The page records 202-214 may be organized into a tree structure comprising a root page 202, internal "branch" pages 204, 206, and "leaf" pages 208-214. The root page 202 may also be referred to as a "branch" page. Access to data in the database storage structure 200 may comprise a traversal of the pages of the tree in order to locate the desired item. The branch nodes 202-206 may also contain references that may be used to access other pages. Traversal of the tree structure may comprise using references to navigate through the structure Various operations on the tree and its constituent pages may involve obtaining locks on the pages. Typically, a page of data is locked rather than an individual item. However, the principles described herein are applicable to variety of locking granularities, including but not limited to row-level locking.

Locks may be described as being either exclusive or non-exclusive. An exclusive lock may be obtained by only one thread at any one time, and moreover may prevent another thread from obtaining a non-exclusive lock. A non-exclusive lock may be simultaneously held by more than one thread.

Typically, a read operation may involve obtaining a non-exclusive lock. Referring back to FIG. 1, each of the reader threads 112 may each obtain a non-exclusive lock on a page of data without interfering with another of the reader threads 112. However, while the non-exclusive locks are held the replication thread 110 may not be able to obtain an exclusive lock on the same page of data.

FIG. 2 shows that certain of the pages 202-214 may be subject to contention, while other pages 202-214 may not be. During the course of processing requests to access data and performing replication operations, the database storage structure 200 may be accessed. Within the database storage structure 200, various replication operations 218 might be performed on a page 214 without contention because, for whatever reason, the page 214 is not being accessed for the purpose of reading data contained within it. In other words, the replication ops 218 may obtain exclusive locks on the page 204 without contention from read operations seeking to obtain non-exclusive locks.

Similarly, another page 214 might be accessed by various read operations 224. For illustrative purposes, it might also be assumed that, for whatever reason, the page 214 is not accessed frequently for the purposes of replication or other operations which use exclusive locks. The read operations 224 may therefore each obtain a non-exclusive lock for accessing the page 214, without contention from other threads.

In contrast, a page 210 might be subject to contention when one or more read operations 222 are occurring at or near the time of one or more replication operations 220. In some instances, a database system may determine that a page is subject to contention when one of the replication operations 220 is unable to obtain an exclusive lock within a threshold amount of time, because one or more of the read operations 222 is holding a non-exclusive lock. Similar, the system might determine that the page 210 is subject to contention when one of the reason operations 222 cannot obtain a non-exclusive lock because one of the replication operations 220 holds an exclusive lock on the page 210.

The database system 120 may load one or more of the pages from the storage structure 200 into memory. This may, for example, improve the performance of the database system 120 by reducing the number of times a copy of a page is read from a relatively slow storage device.

Figure 3:
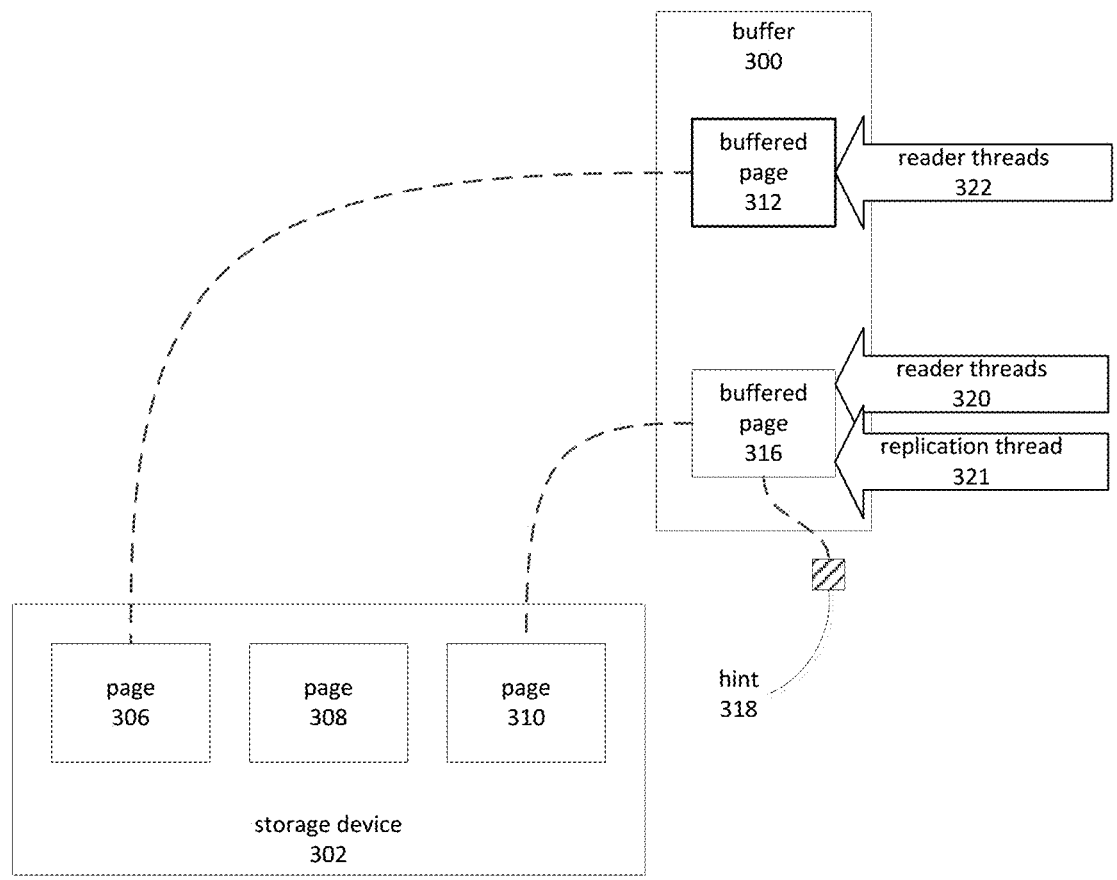
FIG. 3 is a block diagram depicting an example of page buffering.

FIG. 3 is a block diagram depicting an example of page buffering. A storage device 302 may contain pages of a datbase, including the depicted pages 306-310. Although not explicitly depicted in FIG. 3, the pages 306-308 may be organized in a structure similar to the structure 200 depicted in FIG. 2.

When one of the pages 306-310 is accessed for a read operation or modified by a replication thread, it may be loaded from the storage device 302 into a buffer 300. The buffer may be maintained on a random access memory ("RAM") storage device, or other memory with low latency relative to the storage device 302.

Typically, the buffered pages 312, 316 are accessed preferentially over the corresponding pages 306,310 stored on the storage device 302. In some instances, changes made to an item—such as the changes applied by a replication thread—are written first to a buffered page 312, 316 and then subsequently written to disk. For example, a change might be written first to a buffered page 312 and then written, sometime later, to the corresponding page 306 on the storage device 302. In some instances, the buffered page 312 is "flushed" to the storage device, or in other words replaces the copy of the page 306 on the storage device.

The buffered pages 312, 316 might be subject to contention similar to the page contention depicted by FIG. 2. For example, it might be the case that the page 322 is accessed by only reader threads 322 (or primarily by reader threads 322), and may be treated as not subject to contention, while another page 312 is subjected to reader threads 320 and a replication thread 321 on or about the same time, and therefore may be treated as subject to contention.

When a page is subject to contention, the replication thread 321 may associate the page 316 with a hint 318. The hint 318 may comprise a record linked or otherwise associated with the page, or it may comprise data stored on the page. The record in which the hint 318 is stored may be subject to a locking mechanism separate from that which is applied to the page's 316 data, so that replication thread 321 does not acquire an exclusive lock on the page as a whole when storing the hint 318. If any portion of the page 316 is modified to associate the page 316 with the hint 318, a lock may be held on the portion of the page 316 that links to the hint 318, without locking the entire page.

Certain of the pages, such as the depicted page 308, may not be present in the buffer when it is initially accessed. A replication thread might, for example, determine that an item affected by a replication instruction is located in a page stored on disk but not loaded into the buffer 300. The replication thread may, in such cases, proceed to load the page into memory, apply the change, and flush the page back to the storage device. Alternatively, the replication thread may store a record of the change that indicates that the replication instruction should be applied when the page is loaded.

Figure 4:
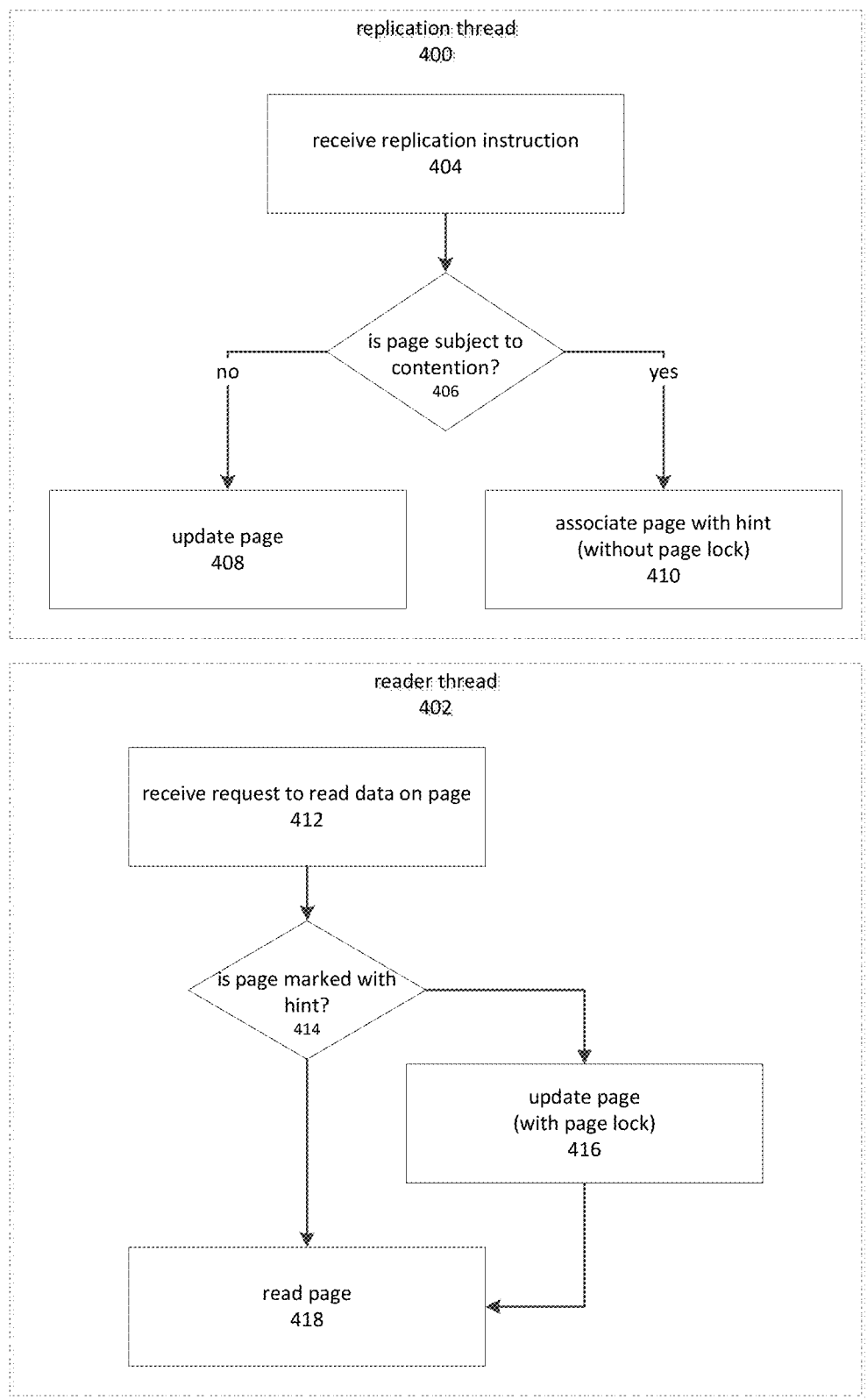
FIG. 4 is a flow diagram depicting a process for deferring replication of a replication-related update

The replication thread 321 may mark the page with the hint 318 in lieu of obtaining an exclusive lock on the page and updating it while the lock is held, and deferring application of the replicated change until a subsequent read operation. FIG. 4 is a flow diagram depicting a process for deferring replication of a replication-related update. In FIG. 4, to related sequences are depicted. The first involves operations performed by a replication thread 400, and the second involves operations performed by a reader thread 402.

The replication 400 may receive information indicative of an instruction to modify the state of the replica, as depicted by block 402. For example, a log file entry may be sent to the replica and processed by the replication thread. The entry may describe a change to the data state of the master database's collection which should also be applied to the replica's copy.

At block 404, the replication thread may determine whether a page, on which the relevant data is located, is subject to contention. This determination, as described herein, may be based on various factors, such as the frequency with which exclusive and/or non-exclusive locks are taken for a page, or on whether or not the page presently has a competing lock.

If the page is not subject to contention, it may be updated as depicted by block 408. Updating the page may comprise applying the instruction to change the data state to the corresponding items stored in the page. The database system may obtain an exclusive lock on the page while the change is being applied.

If the page is subject to contention, the page may be associated with a hint as depicted by block 410. The page may be associated with the hint in lieu of waiting to take an exclusive lock on the page. The update to the item may, moreover, be deferred to a subsequent read operation. Accordingly, the operations of 410 may be performed without taking a lock on the page as a whole. This may permit continued, unimpeded access to the page while the hint is being applied.

Embodiments may mark a page with the hint indication when the page is loaded into a buffer, but not when the page hasn't been loaded, or rather isn't currently loaded, into memory. When a page is located only on a storage device, and not in memory, any changes to be applied by the replication thread may instead be applied synchronously when the page is loaded from the storage device into memory.

The reader thread 402 may receive information indicative of a request to read data stored on the page, as depicted by block 412. At block 414, the reader thread 402 may determine whether the page is marked with a hint. If not, the page may be read as indicated by block 418. Otherwise, the page may be updated as depicted by block 416, and then its contents read and provided in response to the initial request, as depicted by block 418. Typically, the operations of block 416 may be performed using locks on access to the page while the page is being updated.

In the event that there is contention for a page, the responsibility for applying the replication instruction may be deferred to the next reader thread. This may improve efficiency by deferring locking and allowing the replication thread to continue to process changes even when it would, absent the deferral, be subject to stalling while an exclusive lock is acquired.

Note that the read thread to which the write is deferred may still acquire an exclusive lock in order to apply the change. However, overall system efficiency may be improved by stalling reader threads in lieu of stalling a replication thread, since it makes it less likely that the replication thread will fall significantly behind the master computer node.

The deferral of the update from a replication thread to a reader thread may typically be performed in memory, which is to say that a record of the transfer in responsibility may not be recorded in a durable meeting. In the event that a system failure occurs before a reader thread has processed a deferred update, the information indicating that the transfer of responsibility occurred will be lost. However, in some instances the original log file entry may be retained in a durable medium until the read thread has applied the corresponding update. In this manner, the update is not lost. Instead, whether or not contention for a page exists is re-determined at a subsequent time and, if contention exists, the responsibility for the update is again deferred to a reader thread.

Figure 5:
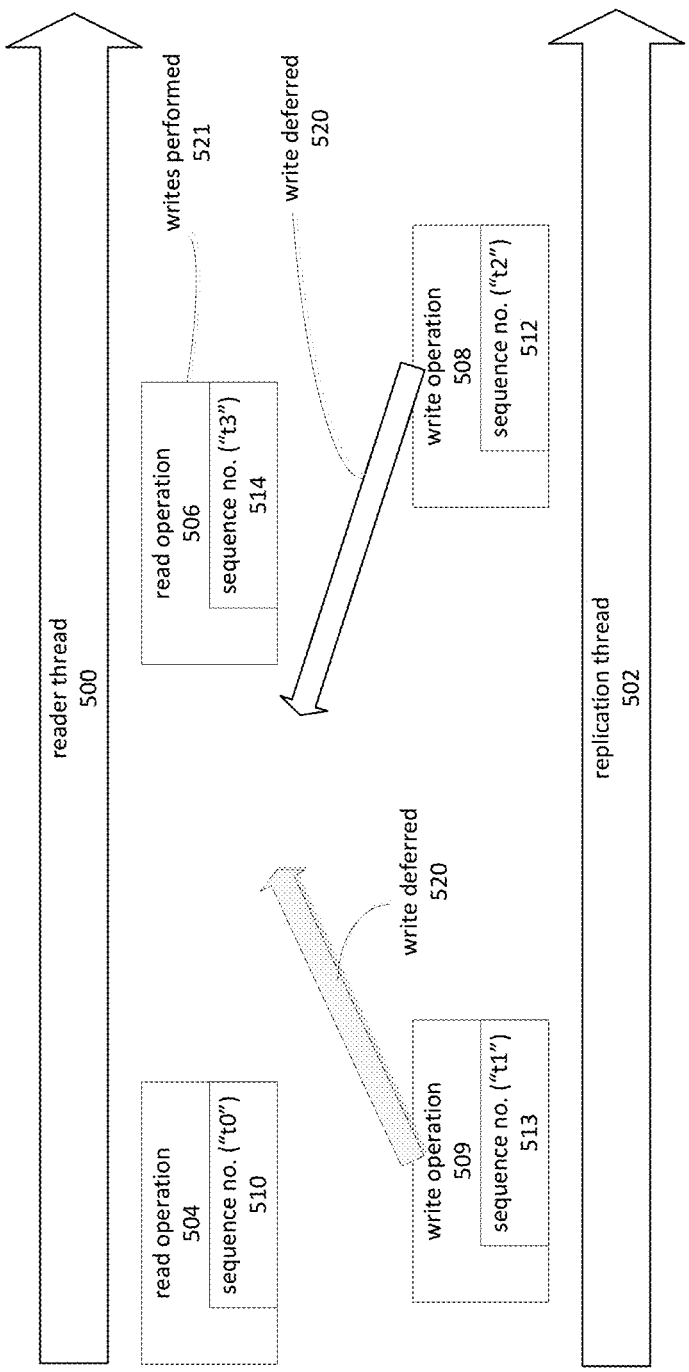
FIG. 5 is a diagram depicting deferral of a write operation from a replication thread to a reader thread.

FIG. 5 is a diagram depicting deferral of a write operation from a replication thread to a reader thread. For illustrative purposes, it may be assumed that a reader thread 500 processes a sequence of read operations including the depicted operations 504, 506 at times "t0" and "t2," respectively. The times of the operations may be identified by properties associated with the read operations 504, 506, such as the depicted sequence numbers 510, 514. The sequence number may, in some cases, be indicative of a It may also be assumed, for illustrative purposes, that a replication thread 502 processes a series of write operations, including the depicted write operation 508 at time "t1," as indicated by the corresponding sequence number 412.

The sequence numbers 510-514 may be timestamp, integer, or other values indicative of a respective ordering of various operations. The sequence numbers 510-514 may be associated with transactions. In the example of FIG. 5, it may be assumed for illustrative purposes that three operations were requested, the first involving a first read operation 504, the second involving a write operation 508, and the third involving a second read operation 506.

The write operation 509 may have occurred at a sequence number "t1" 513, prior to a read operation 506 associated with a sequence number "t3" 514. The write operation 509 may be deferred, as indicated by the arrow 520, if contention exists when write operation 509 is to be applied. When the next read operation 506, at sequence number "t3" 514, the correct value may be obtained by the reader thread, as described herein.

In the example of FIG. 5, it might be the case that the replication thread 502 has fallen behind with respect to the transactions being processed on the reader thread 500. Thus, the reader thread 500 may attempt to process the read operation 506 at sequence number "t3" 514 prior to the replication 502 processing the write operation 508 corresponding to sequence number "t2" 512. If the read operation 506 and write operation 508 were interrelated—i.e. directed to the same item—this could produce an incorrect result.

However, the presence of hints in the page records of contention issues may permit processing of the read operation 506 to be processed differently. Based on the hints, processing of the read operation might include looking ahead to determine that write operation 508 is pending processing in the replication thread 502, and applying the indicated change using the reader thread.

In some cases, the replication thread 502 may be ahead of the reader thread 500. In such cases, a hint might be present in the affected page of data when the earlier read operation 504, at sequence number "t0" 510, is processed. Because the read operation 504 occurs at an earlier sequence number, it might first obtain a result for the read operation and then apply, on the reader thread, the deferred write operation 508.

Figure 6:
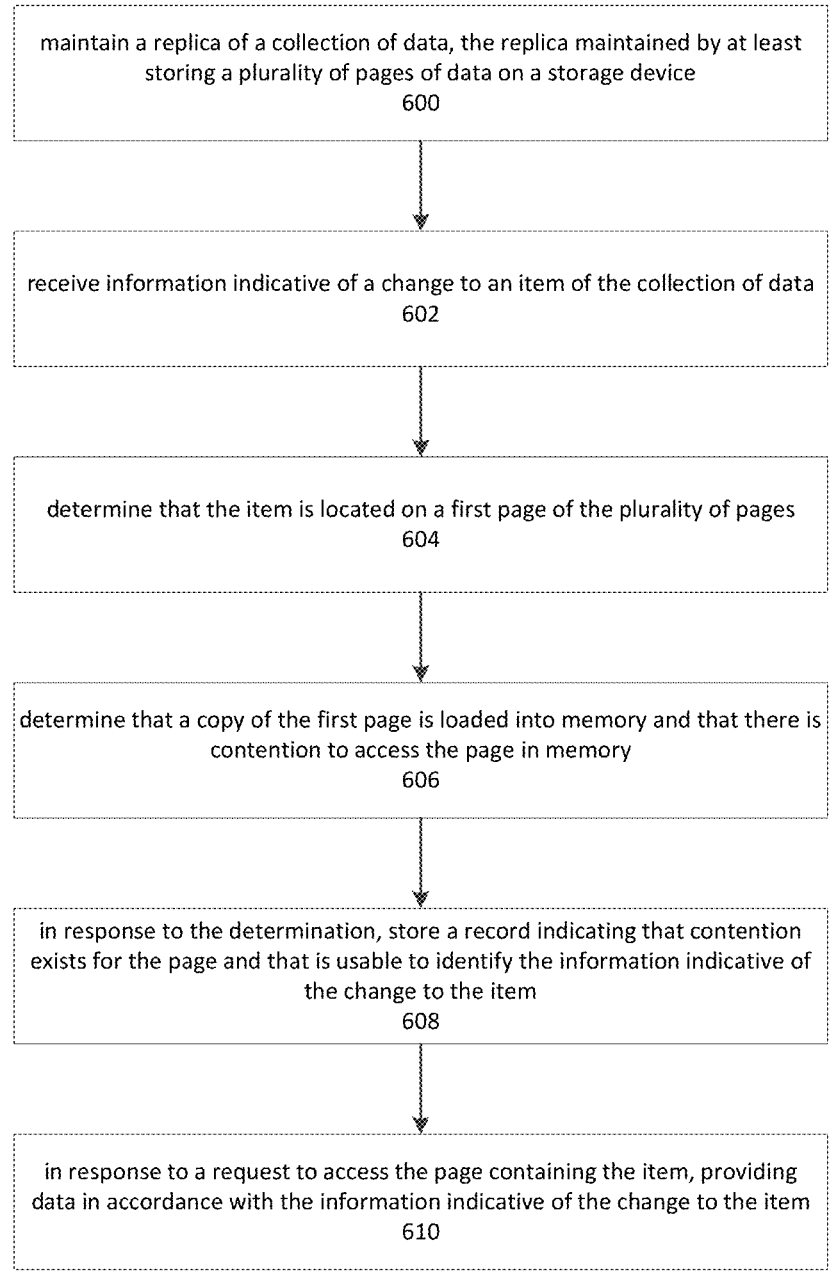
FIG. 6 is a block diagram depicting an example replication process.

FIG. 6 is a block diagram depicting an example process of replicating data. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel.

Block 600 depicts maintaining a replica of a collection of data. The replica may, for example, be maintained on a storage device in data pages consistent with the structure depicted in FIG. 2. Data for the replica may be sent from a master database to the replica using log shipping or other techniques. The data sent from the master may include information that describes changed made to the collection of data on the master.

Block 602 depicts receiving information indicative of a change to an item of the collection of data. The information may correspond, for example, to a log entry sent from the master computing node. The master database may send the information to a computing node on which the replica database runs. Once received, the information may be processed initially by a replication thread running within the replica database.

Block 604 depicts determining that the item is located on a first page of the plurality of pages. This may, for example, comprise scanning a tree-based storage structure or corresponding index, and locating the page that contains the item affected by the change.

Next, block 606 depicts determining that a copy of the first page is loaded into memory and that there is contention to access the page in memory. In some instances, if the page is not in memory no hint is written and the information indicative of the change may be disregarded. This may be the case when a source of the data already maintains a copy of either up-to-date data or the original data and information describing the state change. In other cases, the corresponding change to the item may be written to the page synchronously or asynchronously, such as when the page is subsequently loaded from the storage device into memory.

If the page is loaded into memory, it may be subject to contention between reader threads and the replication thread. The replication thread might determine that the contention exists when it is unable to obtain an exclusive lock within a threshold period of time.

In one example, the database may determine that there is contention for access to the first page when a non-exclusive lock is active on the first page when the system attempts to obtain an exclusive lock.

In another example, the database may determine that there is contention for access to the first page when the frequency with which exclusive locks are obtained on a page exceeds a threshold frequency, or when the frequency with which non-exclusive locks are obtained on a page exceeds a threshold frequency.

In another example, the database may determine that there is contention for access to the first page when an exclusive lock on the first page is not obtained within a threshold amount of time. This time may be set to a relatively short period, and in such cases a spin lock might be used for the exclusive lock.

As depicted by block 608, the database system may, in response to the aforementioned determination, store a record indicating that contention exists for the page. The record may be usable to subsequently locate (via a reader thread, for example) the information describing the change to the item.

Block 610 depicts that the database may, in response to a request to access the page that contains the item, provide data in accordance with the requested change to the item. The page may thus be changed by operations performed by a reader thread instead of the replication thread. In some instances, a copy of the page in memory may be updated to reflect the requested change to the item. Access to the page may be locked during this time. The version of the page held on a storage device may, in some instances, be updated at this time. In other instances, the stored version of the page may be updated later. For example, the in-memory version of the page, containing the update, may at some point be dropped from memory. The stored version of the page may then be updated, using a logged record of the change, up to the time that the page is next accessed.

In some instances, a copy of a page held in memory may be discarded from memory (or, similarly, marked as invalid) in response to identifying the hint associated with the page. For example, a reader thread might begin to read data for an item from the copy of the page, but discover that the page is associated with a hint. In response to identifying the hint, the reader thread might discard the copy of the page from memory, or mark the page as invalid, and cause the page to be reloaded with a current set of data.

In an example, a request to access an item affected by a change may be temporally ordered before or after the change has been applied, based on the relative sequence numbers or transactional order of the respective operations. A reader thread may determine that a change to an item of the collection, as indicated in a page hint and/or its associated replication instruction, is temporally ordered prior to a request to access data. The reader thread may apply the replication instruction and then send the resulting modified item in response to the request.

In another example, the reader thread may determine that a change to an item of the collection is temporally ordered after a request to access data. The reader thread may then send an unmodified item in response to the request, and then apply the replication instruction.

Figure 7:
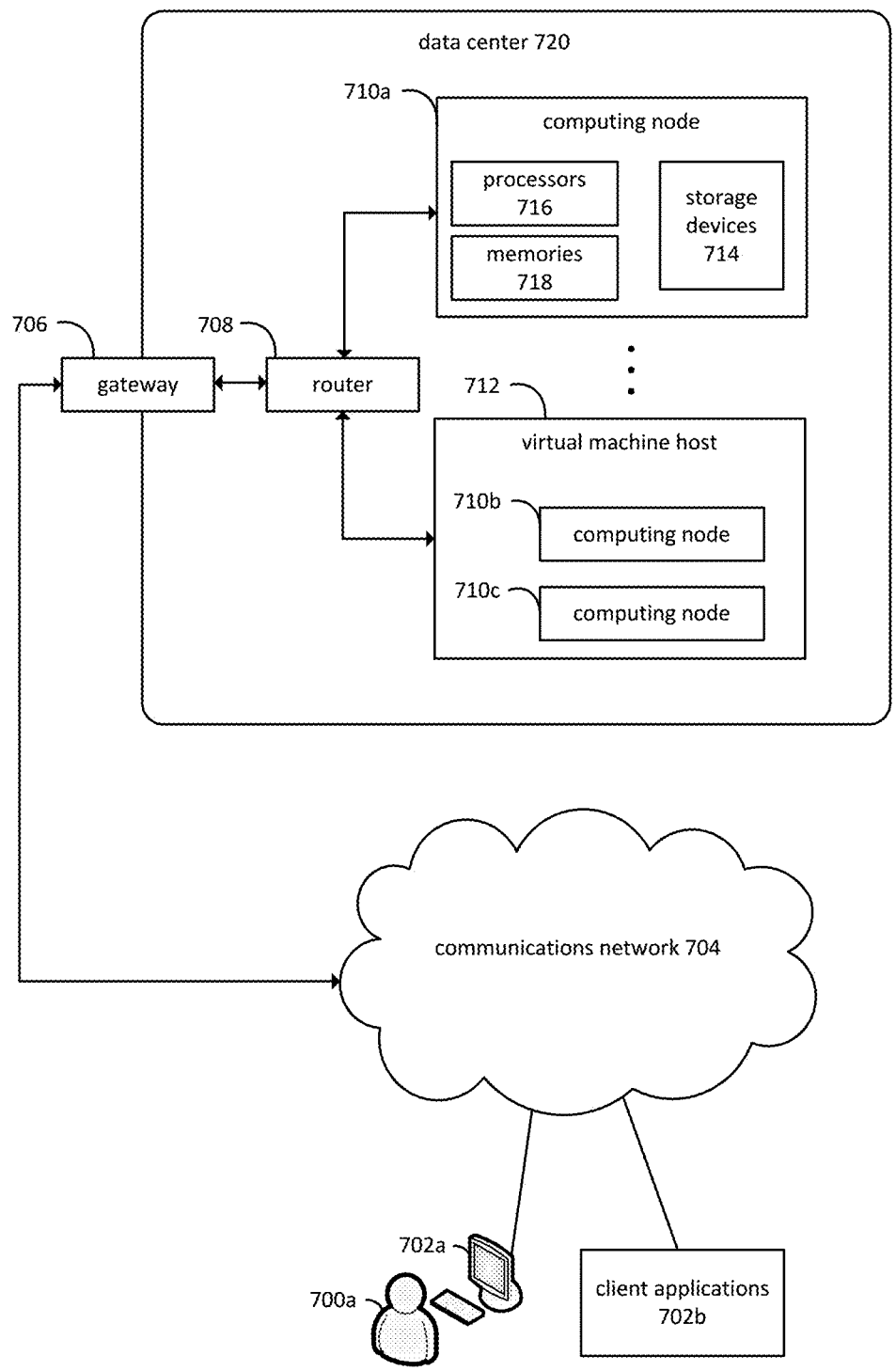
FIG. 7 is a block diagram depicting an embodiment of a computing environment in which aspects of the present disclosure may be practiced.

FIG. 7 is a diagram depicting an example of a distributed computing environment on which aspects of the present invention may be practiced. Various users 700*a* may interact with various client applications, operating on any type of computing device 702*a*, to communicate over communications network 804 with processes executing on various computing nodes 710*a*, 710*b*, and 710*c* within a data center 720. Alternatively, client applications 702*b* may communicate without user intervention. Communications network 704 may comprise any combination of communications technology, including the Internet, wired and wireless local area networks, fiber optic networks, satellite communications, and so forth. Any number of networking protocols may be employed.

Communication with processes executing on the computing nodes 710*a*, 710*b*, and 710*c*, operating within data center 720, may be provided via gateway 706 and router 708. Numerous other network configurations may also be employed. Although not explicitly depicted in FIG. 7, various authentication mechanisms, web service layers, business objects, or other intermediate layers may be provided to mediate communication with the processes executing on computing nodes 710*a*, 710*b*, and 710*c*. Some of these intermediate layers may themselves comprise processes executing on one or more of the computing nodes. Computing nodes 710*a*, 710*b*, and 710*c*, and processes executing thereon, may also communicate with each other via router 708. Alternatively, separate communication paths may be employed. In some embodiments, data center 720 may be configured to communicate with additional data centers, such that the computing nodes and processes executing thereon may communicate with computing nodes and processes operating within other data centers.

Computing node 710*a* is depicted as residing on physical hardware comprising one or more processors 716, one or more memories 818, and one or more storage devices 714. Processes on computing node 710*a* may execute in conjunction with an operating system or alternatively may execute as a bare-metal process that directly interacts with physical resources, such as processors 716, memories 718, or storage devices 714.

Computing nodes 710*b* and 710*c* are depicted as operating on virtual machine host 712, which may provide shared access to various physical resources, such as physical processors, memory, and storage devices. Any number of virtualization mechanisms might be employed to host the computing nodes.

The various computing nodes depicted in FIG. 7 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 8:
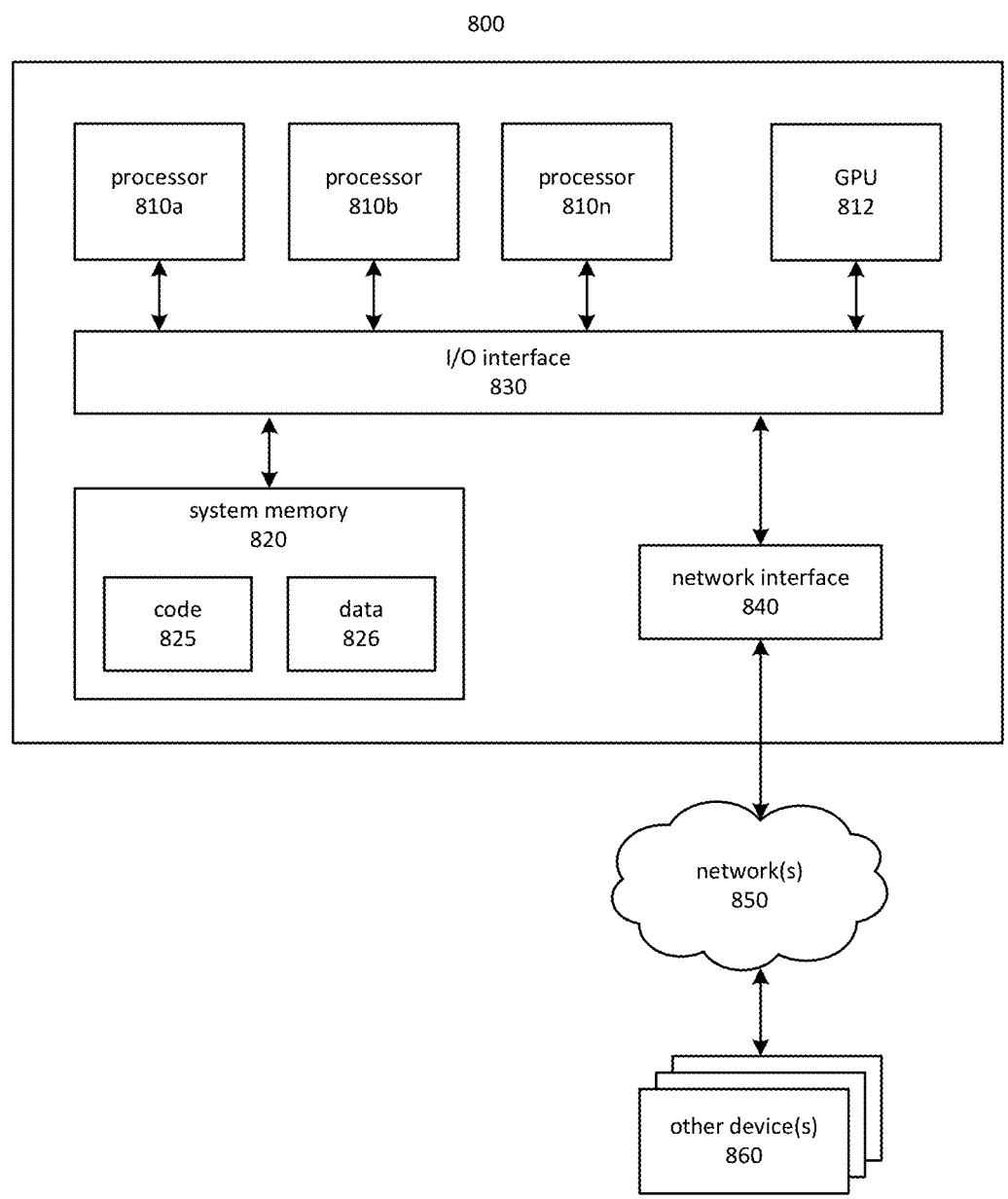
FIG. 8 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 8 depicts a general-purpose computer system that includes or is configured to access one or more computer-accessible media. In the illustrated embodiment, computing device 800 includes one or more processors 810*a*, 810*b*, and/or 810*n* (which may be referred herein singularly as a processor 810 or in the plural as the processors 810) coupled to a system memory 820 via an input/output ("I/O") interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures ("ISAs"), such as the x86, PowerPC, SPARC or MIPS ISAs, or any other suitable ISA. In multiprocessor systems, each of processors 810 may commonly, but not necessarily, implement the same ISA.

In some embodiments, a graphics processing unit ("GPU") 812 may participate in providing graphics rendering and/or physics processing capabilities. A GPU may, for example, comprise a highly parallelized processor architecture specialized for graphical computations. In some embodiments, processors 810 and GPU 812 may be implemented as one or more of the same type of device.

System memory 820 may be configured to store instructions and data accessible by processor(s) 910. In various embodiments, system memory 820 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 820 as code 825 and data 826.

In one embodiment, I/O interface 830 may be configured to coordinate I/O traffic between processor 810, system memory 820, and any peripherals in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect ("PCI") bus standard or the Universal Serial Bus ("USB") standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computing device 800 and other device or devices 860 attached to a network or networks 850, such as other computer systems or devices, for example. In various embodiments, network interface 840 may support communication via any suitable wired or wireless general data networks, such as types of Ethernet networks, for example. Additionally, network interface 840 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 820 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 800 as system memory 820 or another type of memory. Further, a computer-accessible medium may include transmission media or signals, such as electrical, electromagnetic or digital signals, conveyed via a communication medium, such as a network and/or a wireless link, such as those that may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

The system memory 820 may be reconfigured by the operation of one or more of the processors 810. The processors 810 may execute the instructions of a code module and thereby reconfigure the system memory 820 to form data structures and data elements. Forming a data element may therefore refer to operations of the processor 810 to reconfigure the system memory 820. The GPU 812, network interface 840, and I/O interface may also, in some instances, form data structures by reconfiguring the system memory 820. Accordingly, the terms "form" and "forming" may also refer to the operations of these and other devices 860 which may cause the a data structure or data element to be stored in the system memory 820.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:
   a storage device for storing a plurality of database pages of data, wherein the plurality of database pages corresponds to a version of a collection of data maintained by a first computing node;
   a memory; and
   a second computing node that at least:
      receives, from the first computing node, information indicative of a change to an item of the collection of data, the item contained in a first database page of the plurality of database pages;
      determines that the item is located in the first database page, that a copy of the first database page is loaded in the memory, and that there is contention for access to the copy of the first database page, wherein the contention comprises one or more threads attempting to access the copy of the first database page;
      stores information indicative of an association between the copy of the first database page and a first data indicative of a change to at least one item of the first database page, wherein the information indicative of the association is stored without acquiring a lock on access to the copy of the first database page;
      receives a request to access the item; and
      sends a version of the item formed using the information indicative of the change to the item, the version of the item formed in response to determining that the first database page is associated with the first data.

2. The system of claim 1, wherein the second computing node at least:
   determines that there is contention for access to the first database page by determining that a first lock is held on the first database page when attempting to obtain a second lock on the first database page.

3. The system of claim 1, wherein the second computing node at least:
   determines that the change to an item of the collection is temporally ordered prior to the request to access data; and
   sends the modified item in response to the request to access data.

4. The system of claim 1, wherein the second computing node at least:
   modifies a second item in accordance with the information indicative of the change to the item, the second item located in a second database page, prior to loading a copy of the second database page into memory.

5. The system of claim 1, wherein the first data indicates that the copy of the first database page should be reloaded from the storage device.

6. A computer-implemented method, comprising:
   receiving information indicative of a change to an item of a collection of data, wherein the item is in a first page of a plurality of pages stored on a storage device;
   determining that the item is located in the first page, that a copy of the first page is loaded in a memory of the computer, and that access to the copy of the first page is subject to contention;
   storing a record indicative of an association between the page and a first data indicative of at least one change to the page, the record stored in response to the determining;
   storing a version of the item in response to determining that the first page is associated with the first data, the version based at least in part on the information indicative of the change to the item; and
   sending the version of the item in response to a request to access the item.

7. The method of claim 6, wherein the first page comprises a plurality of items of the collection of data.

8. The method of claim 6, further comprising:
   determining that the copy of the first page is subject to contention by identifying a first lock on the copy of the first page when attempting to obtain a second lock on the copy of the first page.

9. The method of claim 6, further comprising:
   determining that the change to the item of the collection is temporally ordered prior to the request to access data; and
   sending the modified item in response to the request to access data.

10. The method of claim 6, further comprising:
    determining that the change to the item of the collection is temporally ordered after the request to access data; and
    sending the unmodified item in response to the request to access data.

11. The method of claim 6, further comprising:
    identifying the association between the first page and the first data;
    discarding the copy of the first page; and
    applying the information indicative of the change to the item to the first page.

12. The method of claim 6, wherein the first data comprises the information indicative of the change.

13. The method of claim 6, wherein determining that access to the copy of the first page is subject to contention comprises calculating a value indicative of a frequency with which the copy of the first page is accessed.

14. A non-transitory computer-readable storage medium having stored thereon executable instructions that, upon execution by a computing device, cause the computing device at least to:
- receive, by a computing node in communication with a storage device, information indicative of a change to an item of a collection of data, wherein the item is stored in a first page of a plurality of pages stored on the storage device;
- determine that the item is located in the first page, that a copy of the first page is loaded in a memory of the computing node, and that access to the first page is subject to contention;
- store in the memory a record indicative of an association between the page and a first data indicative of a change to the item; and
- form a modified version of the item in response to determining that the first page is associated with the first data, the version based at least in part on the information indicative of the change to the item.

15. The non-transitory computer-readable storage medium of claim 14, comprising further instructions that, upon execution, cause the computing device to at least:
- determine that the first page is subject to contention based at least in part on not obtaining an exclusive lock on the first page within a threshold amount of time.

16. The non-transitory computer-readable storage medium of claim 14, comprising further instructions that, upon execution, cause the computing device to at least:
- determine that the change to the item of the collection is temporally ordered prior to a request to access the item; and
- send the modified item in response to the request to access the item.

17. The non-transitory computer-readable storage medium of claim 14, comprising further instructions that, upon execution, cause the computing device to at least:
- determine that the change to the item of the collection is temporally ordered after a request to access data the item; and
- send the unmodified item in response to the request to access the item.

18. The non-transitory computer-readable storage medium of claim 14, comprising further instructions that, upon execution, cause the computing device to at least:
- form a modified version of the item by at least reading the information indicative of the change to the item from a log file.

19. The non-transitory computer-readable storage medium of claim 14, comprising further instructions that, upon execution, cause the computing device to at least:
- discard the copy of the first page in response to identifying the association between the copy of the first page and the first data.

20. The non-transitory computer-readable storage medium of claim 14, wherein determining that access to the first page is subject to contention comprises calculating a value indicative of a frequency of access for the first page.

* * * * *